(12) United States Patent
Guenther et al.

(10) Patent No.: US 8,128,729 B2
(45) Date of Patent: Mar. 6, 2012

(54) FILTER ARRANGEMENT

(75) Inventors: Juergen Guenther, Schriesheim (DE); Thomas Stoesser, Viernheim (DE); Heinz Reinhardt, Edingen (DE); Christopher Klatt, Heidelberg (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 13/069,009

(22) Filed: Mar. 22, 2011

(65) Prior Publication Data

US 2011/0167899 A1 Jul. 14, 2011

Related U.S. Application Data

(63) Continuation of application No. 12/065,856, filed as application No. PCT/EP2006/007430 on Jul. 27, 2006, now abandoned.

(30) Foreign Application Priority Data

Sep. 6, 2005 (DE) .......................... 10 2005 042 406

(51) Int. Cl.
*B01D 46/42* (2006.01)

(52) U.S. Cl. ......... 95/23; 95/10; 95/14; 95/273; 96/420; 96/422

(58) Field of Classification Search ................ 95/10, 14, 95/19, 23, 273; 96/397, 407, 420, 422
See application file for complete search history.

(56) References Cited

U.S. PATENT DOCUMENTS

| 4,007,875 A | 2/1977 | Stolz et al. |
| 4,784,675 A | 11/1988 | Leber |
| 4,859,220 A | 8/1989 | Leber |
| 5,205,156 A | 4/1993 | Asano et al. |
| 6,564,768 B2 | 5/2003 | Bauer et al. |
| 6,711,524 B2 | 3/2004 | Wolf et al. |
| 6,808,547 B2 | 10/2004 | Ota et al. |
| 6,894,620 B2 | 5/2005 | Reinhardt et al. |
| 7,524,362 B2 | 4/2009 | Wu et al. |
| 2003/0167919 A1 | 9/2003 | Schempf |
| 2007/0181000 A1 | 8/2007 | Wilson et al. |
| 2009/0165644 A1 | 7/2009 | Campbell |

(Continued)

FOREIGN PATENT DOCUMENTS

DE 2416805 10/1975

(Continued)

OTHER PUBLICATIONS machine translation of the description of DE 19653135, published Jun. 25, 1998.*

(Continued)

*Primary Examiner* — Robert Clemente
(74) *Attorney, Agent, or Firm* — Grossman, Tucker, Perreault & Pfleger, PLLC

(57) ABSTRACT

A method of providing error correction to flow velocity readings of a fluid flowing through a filter arrangement for monitoring the service life of the filter, wherein a filter arrangement, comprising a filter and a sensor device is arranged downstream of the filter, the sensor device including at least one measuring sensor for detecting the flow velocity of the fluid which flows through the filter, and a further measuring sensor for measuring the air humidity of the fluid which flows through the filter. A reading of said second sensor element provides an error correction to the first sensor element.

17 Claims, 2 Drawing Sheets

U.S. PATENT DOCUMENTS

2009/0211455 A1 8/2009 Gunther et al.

FOREIGN PATENT DOCUMENTS

| DE | 3517481 | 11/1986 |
|---|---|---|
| DE | 196 53 135 | 6/1998 |
| DE | 10000435 | 7/2001 |
| DE | 10140510 | 2/2003 |
| EP | 1285686 | 2/2003 |
| WO | 2004085027 | 10/2004 |

OTHER PUBLICATIONS

International Search Report dated Nov. 29, 2006 issued in related International Patent Application No. PCT/EP2006/007430.
Office Action dated May 12, 2010 issued in related U.S. Appl. No. 12/065,856.
Office Action dated Nov. 22, 2010 issued in related U.S. Appl. No. 12/065,856.

* cited by examiner

FILTER ARRANGEMENT

CROSS-REFERENCE TO RELATED APPLICATIONS

This application is a continuation of U.S. Ser. No. 12/065,856, filed Mar. 5, 2008 which is a National Stage completion of PCT/EP2006/007430, filed Jul. 27, 2008 which claims priority to DE 10 2005 042 406.6, filed Sep. 6, 2005.

TECHNICAL FIELD

The invention relates to a filter arrangement, comprising a filter and a sensor device disposed downstream of the filter for monitoring the service life of the filter, having at least one first measuring sensor for detecting the flow velocity of the fluid flowing through the filter.

STATE OF THE ART

Filter arrangements of this type are known from DE 101 40 510 A 1. Filter systems, such as those in air conditioning systems, have limited fan power, so that the volume flow pumped through the air conditioning system decreases as the particle load of the filter increases. With a sensor device disposed downstream of the filter, having a measuring sensor for detecting the flow velocity, the clogging level of the filter can be determined and a necessary replacement of the filter can be indicated. The filtration of moist air may result in condensation in the filter. The condensation deposited in the filter likewise reduces the volume flow. However, in this case, it is not necessary to replace the filter because the filter can be regenerated by drying. Loading with water, however, cannot be detected only by velocity measurement.

DESCRIPTION OF THE INVENTION

It is therefore the object of the invention to provide a filter arrangement with improved service life monitoring.

In order to solve the task, the sensor device comprises a further measuring sensor for measuring the humidity of the fluid flowing through the filter. The measuring sensor detects the load of the fluid with water. Moisture readings close to the saturation limit indicate that the filter is laden with water. Both readings are evaluated in an evaluation unit, wherein the readings of the moisture sensor bring about an error correction of the flow velocity readings. A further source for errors is the sensitivity of the flow velocity measuring element toward moisture. In particular flow measurement sensors that are formed by measuring wires made of electric resistance material are sensitive toward moisture. The measured air velocity is accordingly dependent on the moisture level. This measurement deviation is compensated for by the simultaneous measurement of the moisture level in a further measuring sensor, and the cross-sensitivity of the air velocity meter toward moisture is reduced. Due to the arrangement on the clean air side, the sensor device is protected from clogging.

The sensor devices may comprise an additional measuring sensor for measuring the temperature of the fluid flowing through the filter. As a result of the temperature sensor, potential cross-sensitivity of the air velocity meter toward temperature fluctuations can be compensated for. In this embodiment, the two essential parameters for controlling an air conditioning system are captured. The readings captured with the inventive sensor device can be provided to an air conditioning controller in order to regulate the air conditioning system. It is advantageous that the sensor device is easily accessible and replaceable and that the sensor device is attached to the filter in a simple manner.

The sensor device can be configured as a preassembled unit. This results in a compact and easy-to-install sensor element. The connection of the measuring sensors to the evaluation unit is advantageously established by means of a single plug connection.

The sensor device can be configured as an injection molded part. Injection molded parts are cost-efficient to produce, even if they have complicated geometries. The measuring sensors are then securely fixed in the injection molded housing.

The sensor device may be disposed at a distance to the filter. The distance is advantageously between 3 and 10 cm. As a result of the distance, the influence of the filter on the fluid flow is reduced, and it is possible to mix the fluid flow, achieving improved measuring accuracy.

The filter may comprise an injection molded frame. The sensor device can be attached particularly easily to the plastic frame.

The sensor device may be attached to the filter non-positively or positively. This produces a detachable connection, so that the filter and sensor device can be replaced independently from each other. The connection can be established by a snap-fit connection, for example. The necessary distance between the sensor device and filter can be created by a cross-member.

The sensor device may be connected to the filter by a material bond. This captively fastens the sensor device to the filter and makes the production of the unit comprising the sensor element and filter cost-efficient. The necessary distance between the sensor device and filter can be created by a cross-member made of a single material.

According to the invention, the filter arrangement is used as a cabin air filter in a motor vehicle. Due to the integration of the sensor device in a filter, the filter arrangement has a particularly compact design and is especially easy to install and replace. As a result of the improved monitoring of the service life, unnecessary maintenance is avoided. Furthermore, the readings can be used for optimization and filter design purposes, for example in order to save installation space in enhanced models.

A further use according to the invention is the provision of the filter arrangement in an inflow of a fuel cell. The arrangement in a PEM fuel cell is particularly advantageous because this cell requires moist inflow to achieve the best possible efficiency. Moistening is frequently achieved by means of a humidifier, for example a membrane humidifier. When providing the filter arrangement according to the invention upstream of a humidifier, the data detected by the sensor device, particularly the moisture of the inflow that is measured, can be used to control the humidifier. The sensor device is disposed particularly compact and easily accessibly in the filter arrangement.

A further advantageous use is the application of the inventive filter arrangement in a mobile device, such as an ambient air purifier. By integrating a sensor in a filter arrangement, a particularly compact design is achieved, which is required for mobile devices.

Furthermore, the filter arrangement according to the invention may advantageously be integrated in the filter systems/filter covers of paint systems. For high-quality painting work, the supply of low-particle air is required. The inventive filter arrangement enables continuous monitoring of the air quality.

BRIEF DESCRIPTION OF THE DRAWINGS

A few embodiments of the inventive filter arrangement will be explained in more detail hereinafter with reference to the figures. They are schematic illustrations.

EXECUTION OF THE INVENTION

Figure 1:
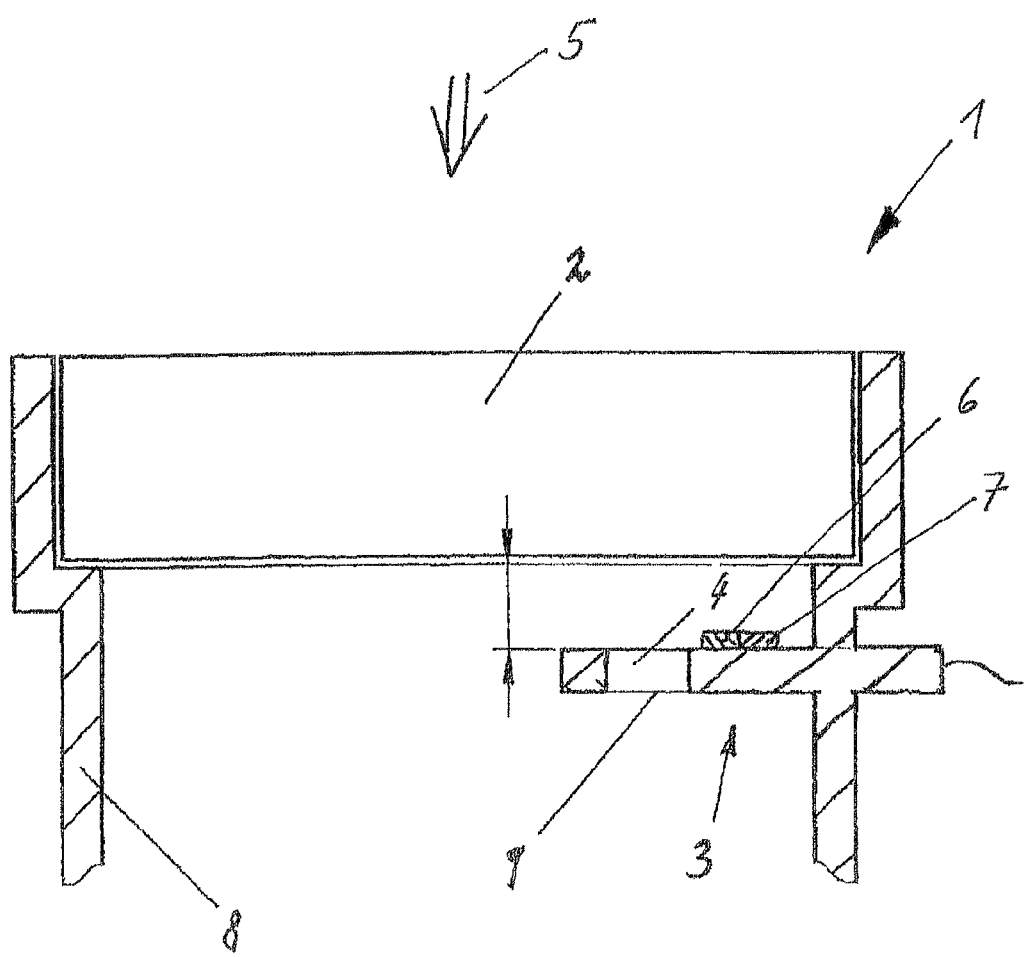
FIG. 1 is a filter arrangement comprising a sensor device attached by material bond.

FIG. 1 shows a filter arrangement 1, which is used as a cabin air filter in a motor vehicle or as a filter in an inflow of a PEM fuel cell. The filter arrangement is made of a filter 2 and a sensor device 3, which is disposed downstream of the filter 2, which is to say on the clean air side. The sensor device on the one hand serves the monitoring of the service life of the filter 2 and on the other hand supplies the on-board electronic system, for example the control system of the motor vehicle air conditioning system, with the detected readings. The sensor device 3 comprises a first measuring sensor 4, which is formed by measuring wires made of electric resistance material 9 and serves the detection of the flow velocity of the fluid 5 flowing through the filter 2. Furthermore, the sensor device 3 comprises a further measuring sensor 6, which is equipped to measure the moisture of the fluid 5 flowing through the filter 2. An additional measuring sensor 7, which is equipped to measure the temperature of the fluid 5 flowing through the filter 2, is likewise provided in the sensor device 3. The filter 2 is provided with a frame 8, which is configured as an injection molded part. The sensor device 3 is produced as one piece with the frame 8 and is made of the same material, wherein the measuring sensors 4, 6, 7 are firmly embedded in the injection molded sensor device 3. The sensor element 3 is fastened to the frame 8 at a distance to the filter 2. Furthermore, the sensor device 3 has an oblong configuration, so that the measuring sensors 4, 6, 7 protrude into the free flow and a falsification of the readings by marginal influences is prevented.

Figure 2:
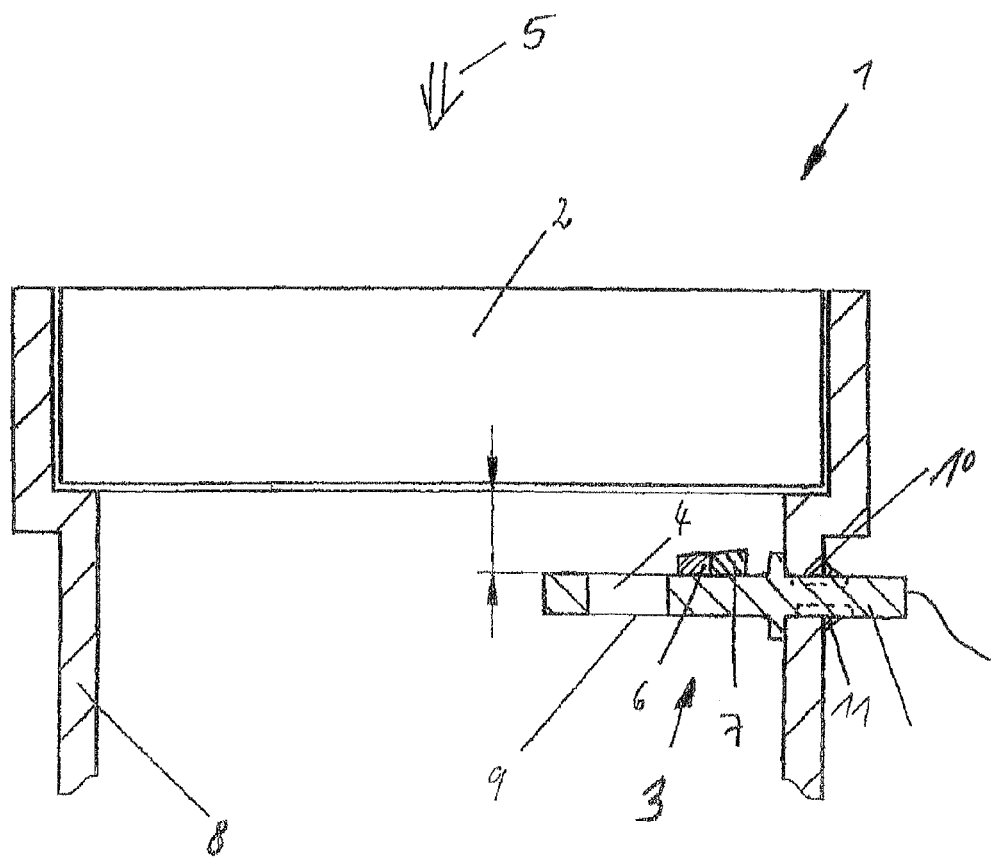
FIG. 2 is a filter arrangement comprising a sensor device attached positively.

FIG. 2 shows a filter arrangement according to FIG. 1, wherein the sensor device 3 is configured as a separate element and forms a preassembled unit. In this embodiment, the sensor device 3 is likewise configured as an injection molded part. The frame 8 comprises a recess 10, into which the sensor device 3 is inserted, wherein the sensor device 3 is positively fixed to the filter 2 by snap-fit elements 11. In other embodiments, the sensor device 3 may also be fastened to the filter 2 non-positively, for example by means of a screw connection.

What is claimed is:

1. A method of providing error correction to flow velocity readings of a fluid flowing through a filter arrangement for monitoring the service life of the filter, comprising:
   providing a filter arrangement, comprising a filter and a sensor device which is fastened to the filter downstream of the filter for monitoring the service life of the filter,
   said sensor device having at least one first sensor element for detecting the flow velocity of the fluid flowing through the filter wherein said first sensor element for detecting a flow velocity is sensitive to moisture,
      wherein the sensor device further comprises a second sensor element for determining the humidity of the fluid flowing through the filter;
      wherein a reading of said second sensor element provides an error correction to a reading of the first sensor element.

2. The method of claim 1, wherein the sensor device further comprises a third measuring sensor for measuring the temperature of the fluid flowing through the filter.

3. The method of claim 1, wherein said readings of said first and said second sensor elements are sent to an evaluation unit to bring about said error correction.

4. The method of claim 1, wherein the sensor device is configured as a preassembled unit.

5. The method of claim 1, wherein the sensor device is configured as an injection molded part.

6. The method of claim 1, wherein the sensor device is disposed at a distance to the filter.

7. The method of claim 1, wherein the filter comprises an injection molded frame.

8. The method of claim 1, wherein the sensor device is fastened to the filter non-positively or positively.

9. The method of claim 8, wherein the sensor device is connected to the filter by material bond.

10. The method of claim 8, wherein the sensor device is connected to the filter by snap-fit elements.

11. The method of claim 8, wherein the sensor device is connected to the filter by a screw connection.

12. The method of claim 1, wherein said frame includes a recess and said sensor device is disposed in said recess.

13. The method of claim 1, wherein said filter arrangement is positioned as a cabin air filter of a motor vehicle.

14. The method of claim 1, wherein said filter arrangement is positioned in an inflow of a fuel cell.

15. The method of claim 1, wherein said sensor device is disposed between 3 cm. and 10 cm. from said filter.

16. The method of claim 1, wherein said first sensor element comprises measuring wires.

17. The method of claim 1, wherein said sensor device has an oblong configuration.

* * * * *